US012677364B2

(12) United States Patent
Santaella Hernandez et al.

(10) Patent No.: US 12,677,364 B2
(45) Date of Patent: Jul. 7, 2026

(54) ELECTRONIC ASSEMBLY FOR AN AUTOMOTIVE LUMINUOS DEVICE AND AUTOMOTIVE LUMINOUS DEVICE

(71) Applicant: VALEO VISION, Bobigny (FR)

(72) Inventors: Juan Jose Santaella Hernandez, Martos (ES); Juan Antonio Lopez, Martos (ES); Juan Moris Gomez, Martos (ES); Alberto Gonzalez Rico, Martos (ES); Maria Carmen Montenegro Sanzhez, Martos (ES)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/722,414

(22) PCT Filed: Dec. 23, 2022

(86) PCT No.: PCT/EP2022/087748
§ 371 (c)(1),
(2) Date: Jun. 20, 2024

(87) PCT Pub. No.: WO2023/118573
PCT Pub. Date: Jun. 29, 2023

(65) Prior Publication Data

US 2025/0089141 A1 Mar. 13, 2025

(30) Foreign Application Priority Data

Dec. 26, 2021 (EP) .................................... 21217761

(51) Int. Cl.
*H05B 45/30* (2020.01)
*H05B 45/50* (2022.01)
(Continued)

(52) U.S. Cl.
CPC ............ *H05B 45/50* (2020.01); *H05B 47/24* (2020.01); *H05B 47/25* (2020.01)

(58) Field of Classification Search
CPC ........ H05B 45/10; H05B 45/30; H05B 45/50; H05B 47/10; H05B 47/20; H05B 47/24; H05B 47/25; Y02B 20/30
See application file for complete search history.

(56) References Cited

U.S. PATENT DOCUMENTS 6,989,635 B2 1/2006 Iwaki et al.
8,368,315 B2 2/2013 Gaines et al.
(Continued)

FOREIGN PATENT DOCUMENTS

EP 3716733 A1 9/2020
JP 2003109779 A 4/2003
(Continued)

OTHER PUBLICATIONS

European Patent Office, International Search Report and Written Opinion of corresponding International Application No. PCT/EP2022/087748, dated Feb. 8, 2023.
(Continued)

*Primary Examiner* — Jimmy T Vu
(74) *Attorney, Agent, or Firm* — Valeo Vision

(57) ABSTRACT

The invention presents an electronic assembly for an automotive luminous device (10) comprising a light source (1), a driver (3) to control the light source (1) and an input protection circuit (2). The input protection circuit (2) is arranged between the power supply and the light source (1) and comprises a protection input (21) and a protection output (22). The protection input (21) and the protection output (22) are connected by the interposition of a resistor group comprising a resistor (23) and a diode (24) connected in series. A node between the protection input (21) and the resistor group is connected to the ground through a first
(Continued)

capacitor (25) and a node between the resistor group and the protection output (22) is connected to the ground through a second capacitor (26).

11 Claims, 3 Drawing Sheets

(51) Int. Cl.
*H05B 47/24* (2020.01)
*H05B 47/25* (2020.01)

(56) References Cited

U.S. PATENT DOCUMENTS

| | | | | |
|---|---|---|---|---|
| 9,504,121 | B2 | 11/2016 | Moon et al. | |
| 10,123,391 | B1 | 11/2018 | Xiong et al. | |
| 10,581,317 | B2 | 3/2020 | Guillot et al. | |
| 10,641,941 | B2 | 5/2020 | Den Breejen et al. | |
| 2018/0367028 | A1* | 12/2018 | Guillot .................... | H02M 1/32 |

FOREIGN PATENT DOCUMENTS

| | | | |
|---|---|---|---|
| JP | 2004122912 | A | 4/2004 |
| JP | 2011507227 | A | 3/2011 |
| JP | 2014216254 | A | 11/2014 |
| JP | 2020502743 | A | 1/2020 |

OTHER PUBLICATIONS

European Patent Office, European Search Report corresponding of the European application No. 21217761.2 dated Jun. 21, 2022.
Japan Patent Office, Office Action (with English translation) of corresponding Japanese Patent Application No. JP2024-538777, dated Jul. 4, 2025, 10 pages.
Japan Patent Office, Search Report (with English translation) of corresponding Japanese Patent Application No. JP2024-538777, dated Jun. 25, 2025, 28 pages.

* cited by examiner

ELECTRONIC ASSEMBLY FOR AN AUTOMOTIVE LUMINUOS DEVICE AND AUTOMOTIVE LUMINOUS DEVICE

TECHNICAL FIELD

This invention belongs to the field of the electronic arrangements for controlling automotive light sources.

BACKGROUND OF THE INVENTION

Automotive lighting market can be considered one of the most competitive ones and new lighting functionalities are constantly required. Some customer trends include the use of RGB (Red-Green-Blue) solid-state light sources, such as RGB LEDs (Light Emitting Diodes) to perform the required lighting and signaling functions.

However, these elements, and their drivers, require a special input protection, to avoid transient pulses that overcome the maximum voltage and could thereby damage the elements and their drivers, thus causing a malfunctioning of the system.

Transient voltage suppressors are usually employed in input protection circuits to prevent this to happen. However, these elements are usually heavy, costly and bulky.

The present invention provides an alternative arrangement to provide a controlled group of solid-state light sources in an electronic assembly for an automotive luminous device, trying to overcome these drawbacks.

SUMMARY OF THE INVENTION

The invention provides an alternative solution for managing the current needs of the light sources of an automotive luminous device by an electronic assembly for an automotive luminous device, the electronic assembly comprising

- a light source
- a driver configured to control the operation of the light source
- a power supply configured to provide electric supply to the light source and to the driver; and
- an input protection circuit arranged between the power supply and the light source, the input protection circuit being intended to limit the transient voltage and/or current received by the light source and/or by the driver and comprising a protection input and a protection output wherein

- the protection input and the protection output are connected by the interposition of a group of a resistor and a diode connected in series, the diode comprising an anode terminal and a cathode terminal,
- the diode's anode terminal is connected to the protection input directly or through the resistor
- a node between the protection input and the resistor group is connected to the ground through a first capacitor and
- a node between the resistor group and the protection output is connected to the ground through a second capacitor.

This automotive luminous device is configured to filter all dangerous pulses, without the need of a proper transient voltage suppressor, which is a costly and bulky element, which takes much room in the substrate. This question is critical for interior lighting RGB modules.

The diode's anode terminal being connected to the protection input allows current to flow freely towards the module driver while protecting the driver from current inversion.

Preferably, the diode's cathode terminal is connected to the protection output directly through the resistor.

In some particular embodiments, the resistor is located closest to the protection output than the diode.

This advantageous location, with the resistor located after the diode, in the current direction, offers a particularly better behavior for negative pulses. However, a different arrangement between the resistor and the diode is also suitable.

When the resistor is located closest to the protection output than the diode, it is preferable that the diode's anode is connected to the protection circuit input, the diode's cathode is connected to the resistor, and the resistor is connected to the protection circuit output.

In some particular embodiments, the first capacitor has a capacitor value higher than 47 nF, and particularly equal or higher than 68 nF and particularly equal or higher than 100 nF.

These values are enough to provide protection against electrostatic discharges.

In some particular embodiments, the second capacitor has a capacitor value equal or higher than 2.2 μF, and particularly equal or higher than 4.7 μF.

These high values, compared with known systems, are intended to provide protection against the dangerous pulses without the need of a transient voltage suppressor.

In some particular embodiments, the resistor has a resistor value comprised between 10 and 40Ω.

In steady state regime, a high resistor value is advantageous for providing a power sharing between the driver and the resistor. Hence, the driver is able to provide higher current to the load (LED), increasing therefore its power delivery capability since the extra heat dissipation, due to voltage increase at the power supply, is shared between the resistor and the driver.

However, a lower resistor value is advantageous for reducing the voltage drop at the resistor, offering the possibility to the system to work at low voltage values from the power supply due to some specific pulses like the cold start, which voltage could decrease to 6 V in a transient period. The claimed range offers an advantageous compromise.

In some particular embodiments, the driver is a DC/DC driver.

In some particular embodiments, the driver is a linear driver.

A linear driver is a simple element which can manage the operation of a single LED.

In some particular embodiments, the light source is a solid-state light source.

The terms "solid state" refer to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In some particular embodiments, the light source comprises at least one RGB LED.

RGB LEDs are useful to provide different colors with a single element. These elements can also be managed by linear drivers.

The invention is particularly adapted for powering RGB LEDs that require relatively low power compared with usual automotive lighting applications. In particular, the invention is best suited for interior lighting wherein the RGB LEDs can be used in accordance to color regulations existing in the automotive lighting field that restrict the color of lighting on the outside of the vehicle. On the other hand, no such regulation exists on interior lighting.

Moreover, interior lighting uses relatively low currents compared with exterior lighting. This implies similarly low power dissipation by Joule effect on the resistor group that is put in series in the input protection circuit and therefore in series with the current powering the driver. In higher power applications, for instance some exterior lighting applications, such a design would imply high power dissipation, which may render the protection circuit unsuitable in that case.

In a further inventive aspect, the invention provides an automotive luminous device comprising an electronic assembly according to the first inventive aspect, and an optical element arranged to project the light emitted by the light source.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term “comprises” and its derivations (such as “comprising”, etc.) should not be understood in an excluding sense, that is, these terms should not be interpreted as excluding the possibility that what is described and defined may include further elements, steps, etc.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

Figure 1:
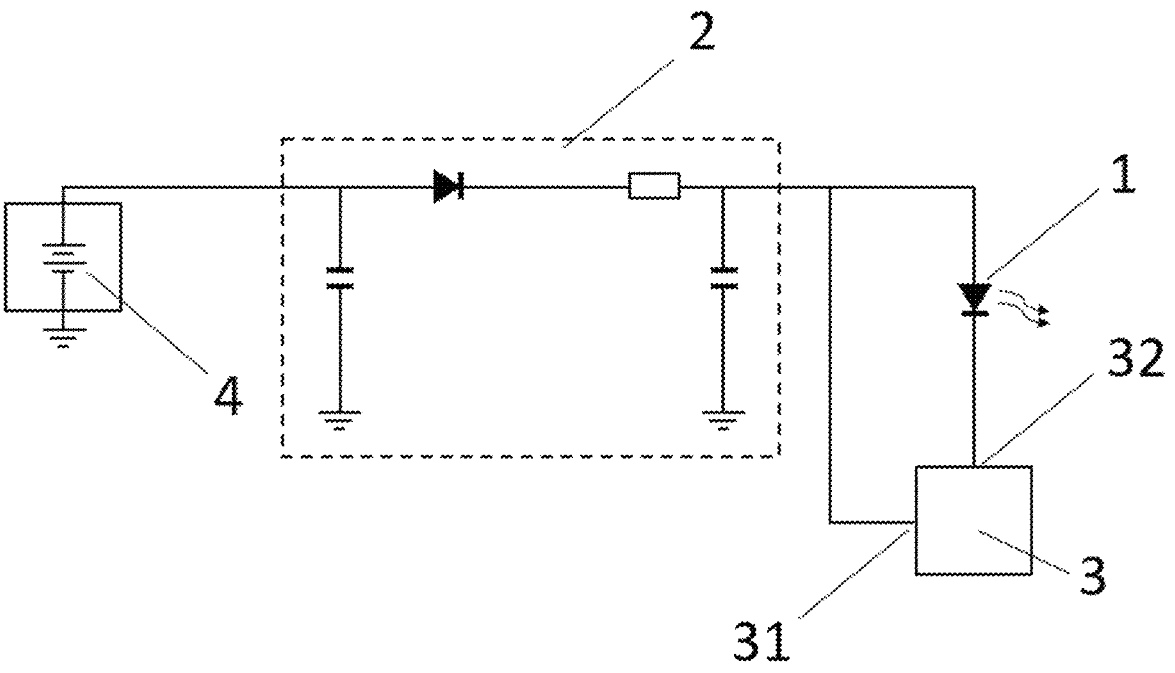
FIG. 1 shows a scheme of an electronic assembly according to the invention.

In these figures, the following reference numbers are used for each of the following elements:

1 LED
2 Input protection circuit
21 Protection input
22 Protection output
23 Resistor
24 Diode
25 First capacitor
26 Second capacitor
3 Driver
4 Power source
10 Automotive luminous device
100 Automotive vehicle

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows a scheme of an electronic assembly according to the invention.

In this figure, a driver element 3 is configured to control the operation of an RGB LED 1.

The driver element 3 receives two inputs: a power input 31 coming from an input protection circuit 2 and a control input 32 intended to control the operation of the RGB LED 1.

The input protection circuit 2 in turn receives the power supply of a power source 4, which comes from the battery of the vehicle.

The input protection circuit 2 is therefore arranged to eliminate every dangerous pulse that may come from the power supply so that, neither the driver nor the LED receive any current or voltage pulse.

As may be seen in this figure, the input protection circuit comprises a protection input 21 receiving the power supply and a protection output 22 connected to the parallel connection of the driver and the light source. Hence, the input protection circuit 2 acts over both the LED 1 and the driver 3.

The driver is a linear driver especially adapted to control the operation of the RGB LED 1.

Figure 2:
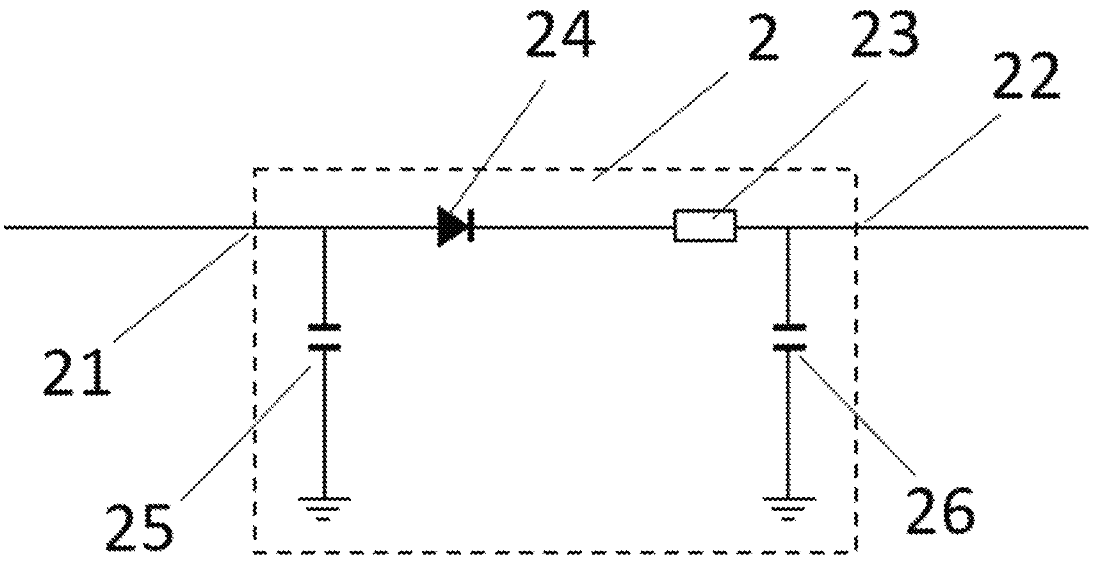
FIG. 2 shows an electric scheme of a protection input circuit comprised in a particular embodiment of an electronic arrangement according to the invention.

FIG. 2 shows an electric scheme of a protection input circuit comprised in a particular embodiment of an electronic arrangement according to the invention.

In this figure, the protection input 21, receiving the power supply, and the protection output 22, connected to the parallel connection of the driver and the LED, are shown.

Between the protection input 21 and the protection output 22, there is a group of a resistor 23 and a diode 24. In this case, the resistor 23 is located after the diode 24, for a better behavior of the arrangement against negative pulses. However, in different embodiments, the diode 24 could be located after the resistor 23.

The input protection circuit further comprises a first capacitor 25 and a second capacitor 26. A node between the protection input 21 and the resistor group is connected to the ground through a first capacitor 25 and a node between the resistor group and the protection output 22 is connected to the ground through a second capacitor 26.

The first capacitor has a capacitor value of 2.2 μF, while the second capacitor has a capacitor value of 4.7 μF. The resistor has a resistor value of 33Ω. With these values, the dangerous pulses are avoided, and the operation of the circuit is perfectly customized to control the operation of the RGB LED 1 by means of the driver 3. These values are mere illustrative values and will depend on the specifications of car manufacturers and on the local regulations.

Figure 3:
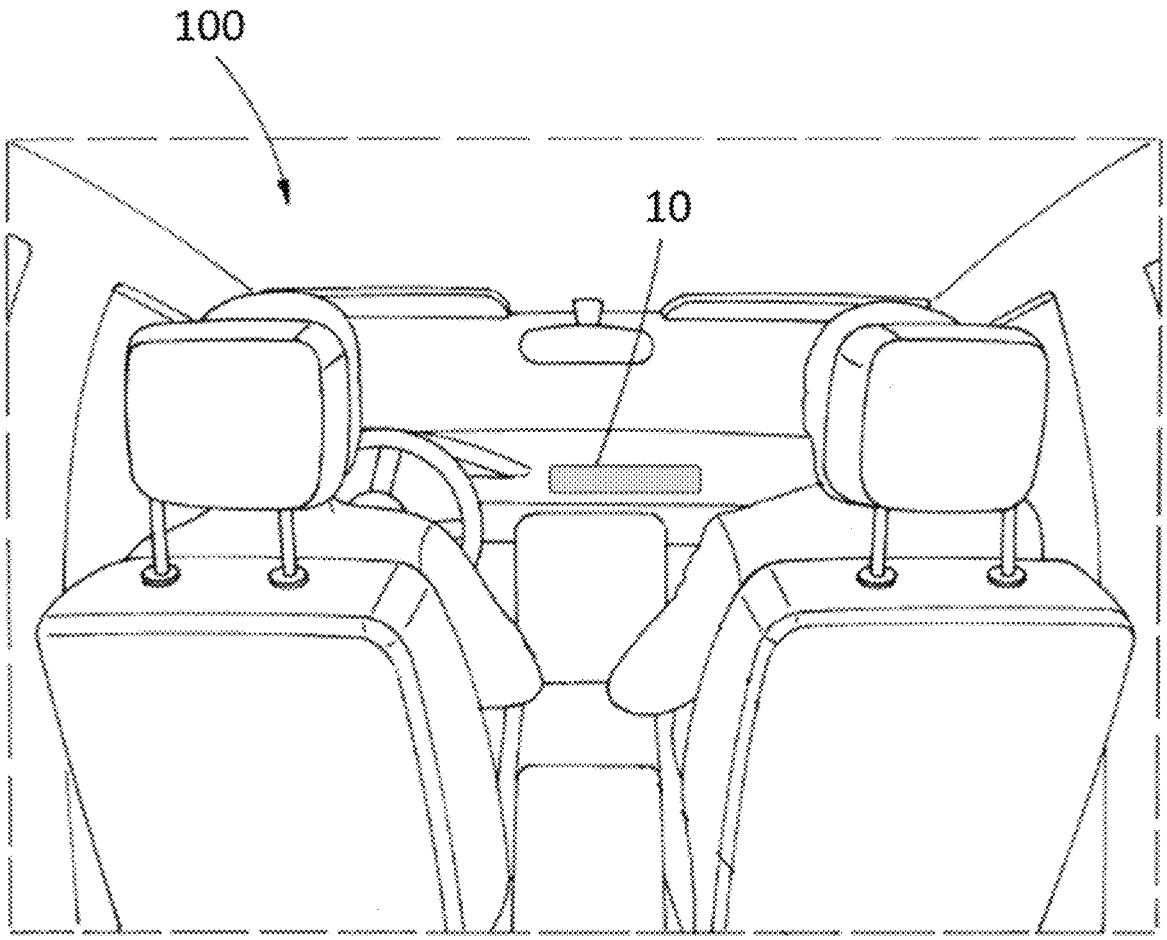
FIG. 3 shows an automotive vehicle comprising an interior luminous device with such an electronic arrangement.

FIG. 3 shows an automotive vehicle 100 comprising an interior luminous device 10 with such an electronic arrangement and an optical lens to project the light emitted by the RGB LED.

What is claimed is:

1. An electronic assembly for an automotive luminous device, the electronic assembly comprising a light source a driver configured to control the operation of the light source, the driver including a driver power input and a driver control input, wherein the light source is electrically connected to the driver control input;

a power supply configured to provide electric supply to the light source and to the driver; and an input protection circuit arranged between the power supply and the light source, the input protection circuit being intended to limit the transient voltage and/or current received by the light source and/or by the driver and includes a protection input and a protection output wherein the protection input and the protection output are connected by the interposition of a resistor group including a resistor and a diode connected in series, the diode having an anode terminal and a cathode terminal, the diode's anode terminal is connected to the protection input directly or through the resistor, a node between the protection input and the resistor group is connected to the ground through a first capacitor and a node between the resistor group and the protection output is connected to the ground through a second capacitor.

2. The electronic assembly according to claim 1, wherein the input protection circuit is also located between the power supply and the driver power input.

3. The electronic assembly according to claim 1, wherein the first capacitor has a capacitor value higher than 47 nF.

4. The electronic assembly according to claim 1, wherein the second capacitor has a capacitor value equal or higher than 2.2 μF.

5. The electronic assembly according to claim 1, wherein the resistor has a resistor value comprised between 10 and 40Ω.

6. The electronic assembly according to claim 1, wherein the driver is a DC/DC driver.

7. The electronic assembly according to claim 1, wherein the driver is a linear driver.

8. The electronic assembly according to claim 1, wherein the light source is a solid-state light source.

9. The electronic assembly according to claim 1, wherein the light source includes at least one RGB LED.

10. The electronic assembly according to claim 1, wherein the resistor is located closer to the protection output than the diode.

11. Automotive luminous device comprising an electronic assembly including a light source a driver configured to control the operation of the light source, the driver including a driver power input and a driver control input, wherein the light source is electrically connected to the driver control input;

a power supply configured to provide electric supply to the light source and to the driver; and an input protection circuit arranged between the power supply and the light source, the input protection circuit being intended to limit the transient voltage and/or current received by the light source and/or by the driver and includes a protection input and a protection output wherein the protection input and the protection output are connected by the interposition of a resistor group including a resistor and a diode connected in series, the diode having an anode terminal and a cathode terminal, the diode's anode terminal is connected to the protection input directly or through the resistor, a node between the protection input and the resistor group is connected to the ground through a first capacitor and a node between the resistor group and the protection output is connected to the ground through a second capacitor; and an optical element arranged to project the light emitted by the light source.

* * * * *